(12) United States Patent
Zhang et al.

(10) Patent No.: US 9,344,856 B2
(45) Date of Patent: May 17, 2016

(54) DETECTION OF FALSE VEHICLE-TO-VEHICLE EMERGENCY BRAKE LIGHT MESSAGES

(71) Applicant: Cisco Technology, Inc., San Jose, CA (US)

(72) Inventors: Tao Zhang, Fort Lee, NJ (US); Douglas Chan, San Jose, CA (US); Helder Antunes, Morgan Hill, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 14/154,314

(22) Filed: Jan. 14, 2014

(65) Prior Publication Data

US 2015/0200957 A1 Jul. 16, 2015

(51) Int. Cl.

| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04W 4/04* | (2009.01) |
| *B60W 30/09* | (2012.01) |
| *G08G 1/16* | (2006.01) |
| *H04W 12/10* | (2009.01) |
| *H04W 4/22* | (2009.01) |

(52) U.S. Cl.
CPC .............. *H04W 4/046* (2013.01); *B60W 30/09* (2013.01); *G08G 1/163* (2013.01); *H04W 4/22* (2013.01); *H04W 12/10* (2013.01)

(58) Field of Classification Search
CPC . H04L 63/1408; H04L 63/14; H04L 63/1441; G06F 21/50; G06F 21/57

USPC .......................................................... 726/22
See application file for complete search history.

(56) References Cited

U.S. PATENT DOCUMENTS

| | | | |
|---|---|---|---|
| 2008/0082261 A1* | 4/2008 | Tengler et al. ................ | 701/210 |
| 2008/0122605 A1* | 5/2008 | Tengler et al. ................ | 340/467 |
| 2008/0122652 A1* | 5/2008 | Tengler et al. ................ | 340/902 |

(Continued)

OTHER PUBLICATIONS

Misra et al., "Detection of Identity-Based Attacks in Wireless Sensor Networks Using Signalprints", IEEE/ACM International Conference on Green Computing and Communications, 2010, pp. 35-41.

(Continued)

*Primary Examiner* — Kambiz Zand
*Assistant Examiner* — Stephen Sanders
(74) *Attorney, Agent, or Firm* — Patterson + Sheridan, LLP

(57) ABSTRACT

The trustworthiness of vehicle-to-vehicle (V2V) messages received from one or more associated vehicles in the vicinity of a subject vehicle is determined autonomously by a false signal detection system of the subject vehicle. Physical evidence relating to the associated vehicles is collected, and a statistical model is used to perform an analysis of the collected data. A V2V message is received by the system from a first one of the associated vehicles and a trustworthiness level of the message is determined in accordance with a correlation between the received V2V message and the result of the analyzed physical data relating to the first associated vehicle. The correlation may be a comparison of data contained in the received V2V message relative to a result of a stochastic analysis of the physical data. The received V2V message may be any V2V safety message including Emergency Electronic Brake Light (EEBL) messages.

21 Claims, 5 Drawing Sheets

(56) References Cited

U.S. PATENT DOCUMENTS

| | | |
|---|---|---|
| 2010/0019891 A1* | 1/2010 | Mudalige .................. 340/425.5 |
| 2010/0198513 A1* | 8/2010 | Zeng et al. ................... 701/300 |
| 2011/0080302 A1* | 4/2011 | Muthaiah et al. ............. 340/903 |
| 2013/0281140 A1 | 10/2013 | Rubin |
| 2013/0297195 A1 | 11/2013 | Das |

OTHER PUBLICATIONS

Newsome et al., "The Sybil Attack in Sensor Networks: Analysis & Defenses", 2004, pp. 259-268.

Xu et al., "Vehicle-to-Vehicle Safety Messaging in DSRC".

\* cited by examiner

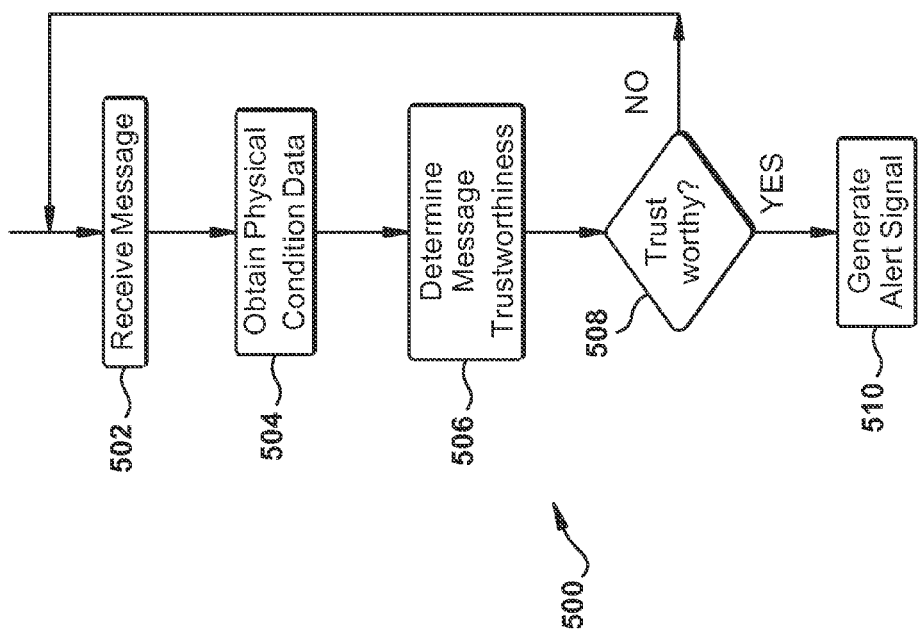

DETECTION OF FALSE VEHICLE-TO-VEHICLE EMERGENCY BRAKE LIGHT MESSAGES

TECHNICAL FIELD

The present disclosure relates generally to electronic communications between mobile apparatus such as vehicles.

BACKGROUND

Vehicle-to-vehicle (V2V) communications enable a wide range of vehicle active safety applications provided in an effort to help reduce traffic accidents. An important category of such applications, known to be highly effective in reducing head-on collisions, is Emergency Electronic Brake Lights (EEBL). When a vehicle performs an emergency braking maneuver generally defined as a deceleration rate exceeding a predefined value, an EEBL application on the decelerating vehicle sends EEBL messages to nearby vehicles so that they can assess collision risks and warn their drivers or take other action as may be necessary or desired. EEBL messages can be disseminated through V2V communications to reach vehicles whose drivers' line of sight to the braking vehicle is obstructed by other vehicles or bad weather conditions. This has been shown to be particularly useful in helping drivers avoid head-on collisions.

However, adversaries can compromise vehicles' communication systems or manipulate the input data to a vehicle's EEBL application to cause a vehicle to send false EEBL messages using the vehicle's valid security credentials or by other means. For example, a malicious software or hardware with access to the vehicle's Car Area Network (CAN) can send fictitious braking status and vehicle position information to the EEBL application to cause it to send EEBL messages when the vehicle is in fact not braking or when the vehicle is not braking above a threshold deceleration rate suggestive of an emergency or panic stop maneuver. This can cause nearby drivers to make abrupt maneuverers that can significantly increase traffic accidents. Therefore, an important factor for making EEBL applications deployable is an ability to detect false EEBL messages or, in other words, to determine the trustworthiness of the received EEBL messages.

BRIEF DESCRIPTION OF THE DRAWINGS

The accompanying drawings incorporated herein and forming a part of the specification illustrate the example embodiments.

FIG. 5 is a flow chart illustrating an example methodology of detecting false V2V messages in accordance with an example embodiment.

DESCRIPTION OF EXAMPLE EMBODIMENTS

Overview

Figure 1:
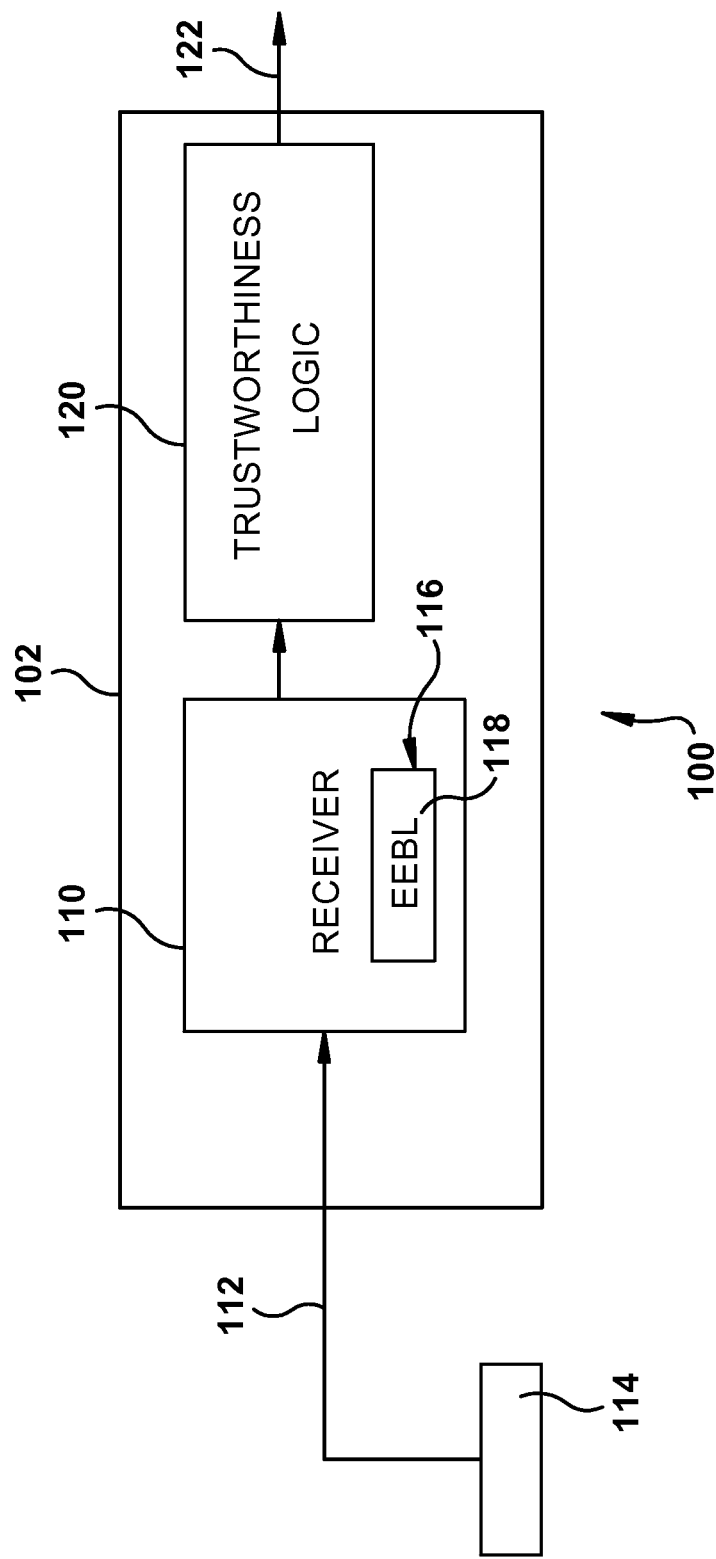
FIG. 1 is a simplified block diagram illustrating a system for detecting false V2V messages in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with embodiments herein, systems, methods and logic encoded in one or more tangible non-transient computer readable media for execution by a processor and when executed by the processor, the logic, systems, and methods are operable to assess the trustworthiness of selected one or more V2V messages. In one embodiment, the trustworthiness level of a V2V safety message is determined. In another embodiment, the trustworthiness level of an EEBL V2V message is determined. In yet another embodiment, the trustworthiness level of a vehicle "speeding" V2V message is determined. In still another embodiment, the trustworthiness level of a vehicle accelerating suddenly V2V message is determined.

In embodiments herein, the trustworthiness levels of V2V safety messages are determined using data contained in the safety message and a stochastic analysis of physical data obtained from the relevant area adjacent the vehicle, and safety alert signals are selectively generated responsive to the resultant trustworthiness levels determined.

In accordance with embodiments herein, systems, methods and logic encoded in one or more tangible non-transient computer readable media for execution by a processor and when executed by the processor the logic, systems, and methods are operable to use a statistical model to autonomously determine (i.e., without relying on help from other vehicles) the trustworthiness of received EEBL messages. The systems, methods and logic correlate each received EEBL message with data representative of physical evidence collected autonomously relative to associated monitored one or more vehicles. The logical trustworthiness levels of V2V safety messages are thereby determined and safety alert signals are selectively generated responsive to the determined trustworthiness levels.

In accordance with an example embodiment, there is disclosed herein an apparatus comprising a wireless receiver configured to receive a first signal from an associated first vehicle, and message trustworthiness logic operatively coupled with the wireless receiver and operable to obtain data representative of a physical condition of the associated first vehicle. The first signal comprises a first message representative of a relative safety condition between the associated first vehicle and the apparatus. The message trustworthiness logic determines a trustworthiness level of the first message received by the wireless receiver in accordance with a statistical modeling of the data representative of the physical condition of the associated first vehicle. Further, the message trustworthiness logic selectively generates a safety alert signal responsive to the determining of the trustworthiness level of the first message.

In accordance with a further example embodiment, there is disclosed herein a method comprising receiving by a wireless receiver a first signal from an associated first vehicle, wherein the first signal includes a first message representative of a relative safety condition between the associated first vehicle and the apparatus. Data representative of a physical condition of the associated first vehicle is received by message trustworthiness logic operatively coupled with the wireless receiver. Message trustworthiness logic determines a trustworthiness level of the first message received by the wireless receiver in accordance with a statistical modeling of the data representative of the physical condition of the associated first vehicle. Message trustworthiness logic selectively generates a safety alert signal responsive to the determining of the trustworthiness level of the first message.

In accordance with yet a further example embodiment, there is disclosed herein logic encoded in one or more tangible non-transient computer readable media for execution by a processor and when executed by the processor the logic being operable to receive by a wireless receiver a first signal from an associated first vehicle, the first signal comprising a first message representative of a relative safety condition between the associated first vehicle and the apparatus, obtain by message trustworthiness logic operatively coupled with the wireless receiver data representative of a physical condition of the associated first vehicle, determine by the message trustworthiness logic a trustworthiness level of the first message received by the wireless receiver in accordance with a statistical modeling of the data representative of the physical condition of the associated first vehicle, and selectively generate by the message trustworthiness logic a safety alert signal responsive to the determining of the trustworthiness level of the first message.

DETAILED DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide for the autonomous determination of the trustworthiness of V2V messages received from associated vehicles. The determined trustworthiness of the V2V messages may be represented in any way or form as may be necessary or desired, but in the example embodiment the determined trustworthiness of the V2V messages is represented as a logical level such as, for example, as a logical "True" or "1" for the V2V messages being determined to be trustworthy or reliable, and a logical "False" or "0" for the V2V messages being determined to be not trustworthy or unreliable. In an embodiment, a statistical model is used for determining the trustworthiness of the V2V messages. In particular, in the example embodiment, a stochastic model of acquired physical data is used for determining the trustworthiness of the V2V messages. The system collects physical evidence relating to the V2V message, and determines from the evidence using the statistical model a trustworthiness level of the V2V messages and, overall, whether the V2V message is trustworthy (true) or untrustworthy (false). In the example embodiment, no fixed learning period is needed to calibrate the machine learning model to determine which V2V messages are relevant.

In an embodiment, the V2V message is a V2V safety message. In a particular embodiment, the V2V message is an EEBL message. The embodiments herein determine if the EEBL message is false (not trustworthy) by monitoring the power level of the radio signals it receives from nearby vehicles. The example embodiments herein use a statistical model to analyze the changes in power level received over consecutive time intervals. In particular, the example embodiments herein use a stochastic model; namely the Wiener process, to analyze the changes in power level received over consecutive time intervals.

A further embodiment herein selectively determines if the EEBL message is false by monitoring Doppler shift in radio signals, and then analyzes changes therein received over consecutive time levels, and uses one or more statistical models to dynamically determine whether the V2V message is false (or true). In the embodiment, the system collects physical evidence relating to the V2V messages in the form of data relating to the monitored Doppler shift in radio signals, and then analyzes changes therein received over consecutive time levels, and uses one or more statistical models such as for example the Wiener process to dynamically determine whether the V2V message is false (or true).

The example embodiments herein require very low computational complexity. Also, embodiments may selectively include error correction functionality as necessary or desired to correct for errors/defects in received radio signals. Further, embodiments herein may also include, as necessary or desired, an ability to determine a source of the received radio signals, such as originating from a certain car manufacturer or the like and, using data related to the determined source of the received radio signals, performing one or more adjustments to the determining of whether the V2V message is false (or true) based on characteristics of such radio signal.

With reference now to the drawing Figures, wherein the showings are for purposes of illustrating example embodiments only and not for purposes of limiting same, FIG. 1 illustrates a basic block diagram of a system 100 for determining the trustworthiness of V2V messages in accordance with an example embodiment. As shown, the system 100 includes an apparatus 102 comprising a wireless receiver 110 configured to receive a first signal 112 from an associated first vehicle 114, and message trustworthiness logic 120 operatively coupled with the wireless receiver 110. "Logic" and/or "module" as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSoC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

The first signal 112 received by the wireless receiver 110 comprises a first V2V message 116 representative of a relative safety condition between the associated first vehicle 114 and the apparatus 102. The message trustworthiness logic 120 is operatively coupled with the wireless receiver 110 and is operable to obtain data representative of a physical condition of the associated first vehicle 114. In accordance with the example embodiment, the message trustworthiness logic 120 determines a trustworthiness of the first V2V message 116 received by the wireless receiver 110 in accordance with a statistical modeling of the data representative of the physical condition of the associated first vehicle. The message trustworthiness logic 120 selectively generates a safety alert signal 122 responsive to the determining of the trustworthiness of the first V2V message 116. The trustworthiness of the first V2V message maybe represented in any desired form but is preferably represented as a logical trustworthiness level wherein the safety alert signal 122 is accorded a logical "True" or "1" when the first V2V message is determined to be reliable, and the safety alert signal 122 is accorded a logical "False" or "0" when the first V2V message is determined to be unreliable. The safety alert signal 122 may be used to provide advisory services to the driver and/or may be used to make definitive decisions such as rapid application of braking systems of the vehicle. In an example embodiment the first V2V message 116 is an EEBL message 118. Further in an example embodiment, the message trustworthiness logic 120 selectively determines the trustworthiness of the EEBL message 118 by a statistical modeling of the data representative of the physical condition of the associated first vehicle such as, for example, a received signal strength which may infer a relative distance of the associated vehicle relative to the apparatus 102. The statistical modeling may be a stochastic modeling of the data representative of the physical condition of the associated first vehicle such as a Wiener process, for example. In the example embodiment, the data representative of the physical condition of the associated first vehicle is signal strength data representative of the strength of the signals received by the receiver 110 which is used in the example embodiment to infer a relative distance of the associated vehicle relative to the apparatus 102. Other sources of data and other types of physical conditions may be used as well.

Figure 2:
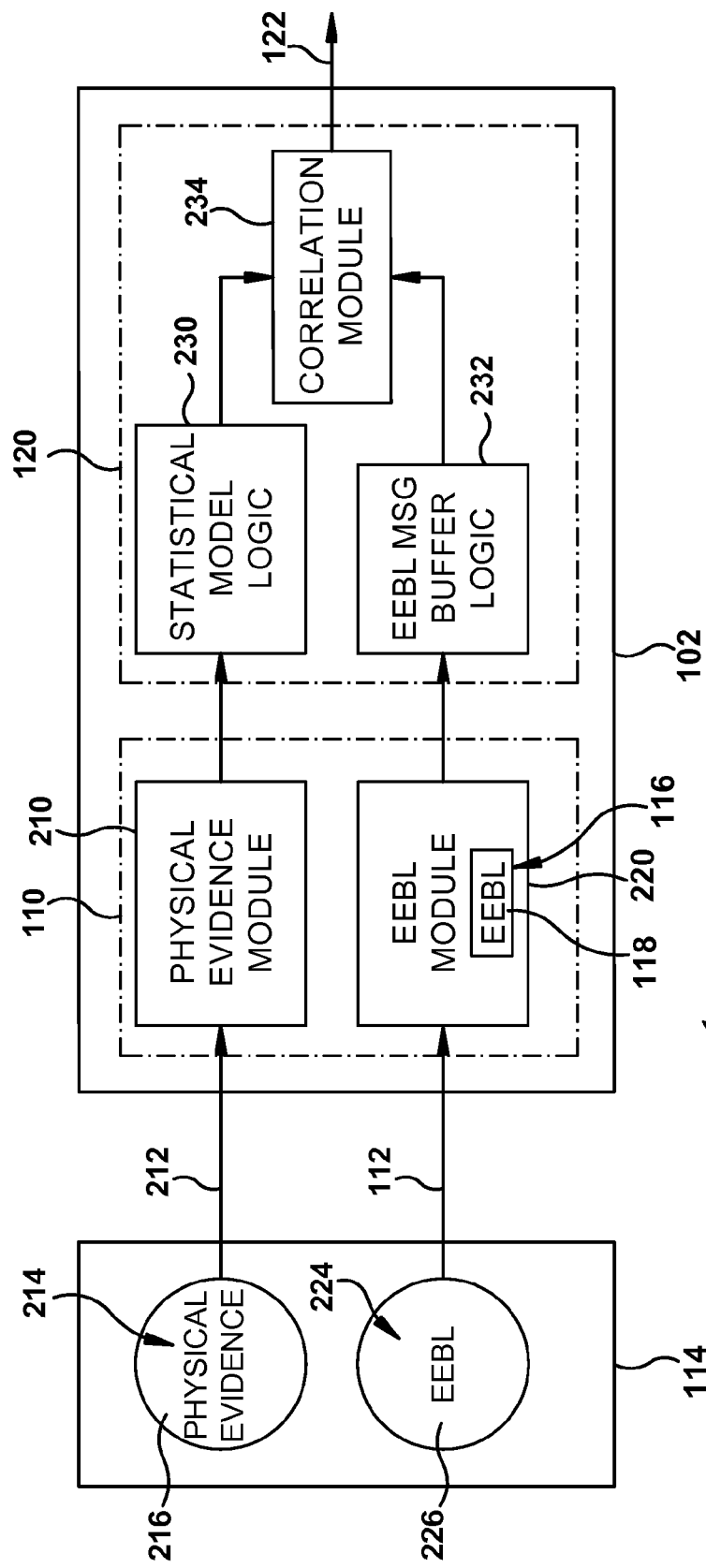
FIG. 2 is a more detailed block diagram illustrating a system for detecting false V2V messages in accordance with an example embodiment.

FIG. 2 is a more detailed block diagram of a system 200 such as the system 100 shown in FIG. 1 and illustrating functional components of the apparatus 102 for detecting false V2V messages in accordance with an example embodiment by monitoring one or more selected physical evidence values of the associated vehicle such as the power level of the radio signals received from nearby vehicles 114, processing the one or more physical evidence values such as by using a stochastic modeling of the power level of the radio signals received from nearby vehicles, and correlating the modeled power levels with the occurrence of selected V2V messages such as EEBL messages for example. In the embodiment, the wireless transceiver 110 includes a physical evidence module 210 configured to receive one or more physical evidence signals 212 representative of a corresponding one or more items of physical evidence 214 of the associated vehicle 114. In the example embodiment, the one or more items of physical evidence 214 of the associated vehicle 114 are one or more RF signal strength signals 216 of one or more transmitters of the associated vehicle. The RF signal strength may infer a relative distance between the associated vehicle 114 and the apparatus 102. Further in the embodiment, the wireless transceiver 110 includes an EEBL module 220 configured to receive one or more first signals 112 representative of a corresponding one or more V2V messages 224. In the example embodiment, the one or more V2V messages 224 may include one or more EEBL messages from the associated vehicle 114. The first signal 112 received by the wireless receiver 110 comprises a first V2V message 116 representative of a relative safety condition between the associated first vehicle 114 and the apparatus 102. In an example embodiment the first V2V message 116 is an EEBL message 118.

Similarly in the example embodiment, the message trustworthiness logic 120 includes a statistical model module 230, an EEBL message buffer module 232, and a correlation module 234. The trustworthiness logic 120 determines a logical trustworthiness level of the first V2V message 116 received by the wireless receiver 110 in accordance with a correlation between a statistical modeling of the data representative of the physical condition of the associated first vehicle and the type of V2V message or a content of the V2V message. The message trustworthiness logic 120 selectively generates a safety alert signal 122 responsive to the determining of the trustworthiness of the first V2V message 116, wherein the safety alert signal 122 is generated when the V2V message is not correlated with the statistical modeling of the data representative of the physical condition of the associated vehicle, and the safety alert signal 122 is not generated when the V2V message correlates with the statistical modeling of the data representative of the physical condition of the associated vehicle. In an example embodiment the first V2V message 116 is an EEBL message 118. Further in an example embodiment, the message trustworthiness logic 120 selectively determines the trustworthiness of the EEBL message 118 by a statistical modeling at the statistical model module 230 of the data representative of the physical condition of the associated first vehicle such as, for example, a received signal strength which may infer a relative distance of the associated vehicle relative to the apparatus 102. The statistical modeling at the statistical model module 230 may be a stochastic modeling such as a Wiener process, for example. The EEBL message buffer module 232 may include error correction functionality to correct for errors and/or defects in the radio signals received from the one or more associated vehicles 114. The EEBL message buffer module 232 may, in addition, include functionality for determining a source of radio signals, such as from one or more certain car manufacturers, and then selectively adjust false V2V message determinations based on the characteristics of the radio signals.

The message trustworthiness logic 120 is operatively coupled with the wireless receiver 110 and is operable to obtain data representative of one or more physical conditions of the associated first vehicle 114 via the physical evidence module 210. In accordance with the example embodiment, an output from the EEBL message buffer module 232 is compared with the output from the statistical model module 230 at a correlation module 234 wherein a determination is made whether there is any physical evidence supporting a corresponding V2V message. In an example embodiment, if it is found in accordance with the statistical model that the physical evidence supporting a corresponding V2V message is below a predetermined selectable threshold, it is determined that the V2V message is false and, accordingly, the safety alert signal 122 is not generated. Correspondingly, if it is found in accordance with the statistical model that the physical evidence supporting a corresponding V2V message is at or exceeds the predetermined selectable threshold, it is determined that the V2V message is true (or valid) and, accordingly, the safety alert signal 122 is generated.

As will be described herein in greater detail, the embodiments relate to systems and methods for enabling a vehicle to use one or more statistical models to autonomously determine (i.e., without relying on help from other vehicles) the trustworthiness of received V2V messages such as, for example, EEBL messages. In the embodiments, physical evidences relating to other vehicles are collected by a vehicle independent of the other vehicles. Thereafter, each EEBL message received by the subject vehicle comprising the system of the embodiments herein is correlated with one or more types of physical evidence values collected by the subject vehicle itself. When the received EEBL message correlates with a processing of the selected physical evidence such as by a stochastic modeling, a trustworthiness of the EEBL message is confirmed. However, when the received EEBL message fails to correlate with the modeling of the selected physical evidence, the trustworthiness of the EEBL message is denied.

In an example, EEBL messages may be sent from an arbitrary vehicle u to vehicle v. In the example, it may be assumed without loss of generality that vehicle u is ahead of vehicle v. While vehicles u and v drive normally and neither of them engage in emergency braking, the level of the radio power received (i.e., RSSI) by vehicle v from vehicle u should not change significantly over a very short time interval. However, when vehicle u performs an emergency braking maneuver, the distance between the two vehicles would reduce significantly and rapidly and hence it would be expected that the level of radio power received by vehicle v from vehicle u should increase significantly and suddenly as well. Therefore, an EEBL message from vehicle u will be less trustworthy when it is not accompanied by a significant change in the level of received power from u. It is to be appreciated that although radio power received is used in the above example, other items of one or more physical evidence(s) relating to a behavior, position, speed, acceleration, etc. of the other vehicle may be equivalently used as well in connection with correlating one or more received V2V messages for purposes of determining the trustworthiness of the V2V messages.

In accordance with an embodiment, for detection of false EEBL messages, the false message detection system of each vehicle v monitors physical evidence of each nearby vehicle u such as for example the power level of the radio signal it receives ("received power level") from each nearby vehicle u. Since vehicles typically broadcast a few safety messages per second to nearby vehicles, each vehicle is able to receive several samples of received power levels every second. In an example, $p(v, u, t)$ may be used to denote the power level received by vehicle v from vehicle u at time t. Further in the example, each vehicle v uses a statistical model such as for example a Wiener process to analyze the change $p(v, u, \Delta t)$ in the received power level $p(v, u, t)$ over each consecutive time interval of length $\Delta t$ time units, where $p(v, u, \Delta t) = p(v, u, t) - p(v, u, t-\Delta t)$. Still further in the example, the value of $\Delta t$ is preferably set to be small enough so that if a significant change is detected over the interval, the vehicle will still have sufficient time to issue a warning message to the driver, while also providing the driver sufficient time to react to the warning message.

Each vehicle v determines the trustworthiness of V2V messages from any other vehicle u by correlating the V2V message (the type of V2V message and/or data contained in the V2V message) with a change in the received physical evidence data or signal from vehicle u. More particularly, the trustworthiness of a V2V message at time t is determined by correlating the message with the change (if any) in the received physical evidence occurring at or near the time t. For example, an increase of the RSSI by at least 3 dB over a 1 second interval can indicate a significant change in the relative separation distance between vehicles. If such a significant change has occurred when the EEBL is received, the EEBL will be trusted. If no significant abnormal change in the received power level is detected, the EEBL message will be treated as suspicious.

Figure 3:
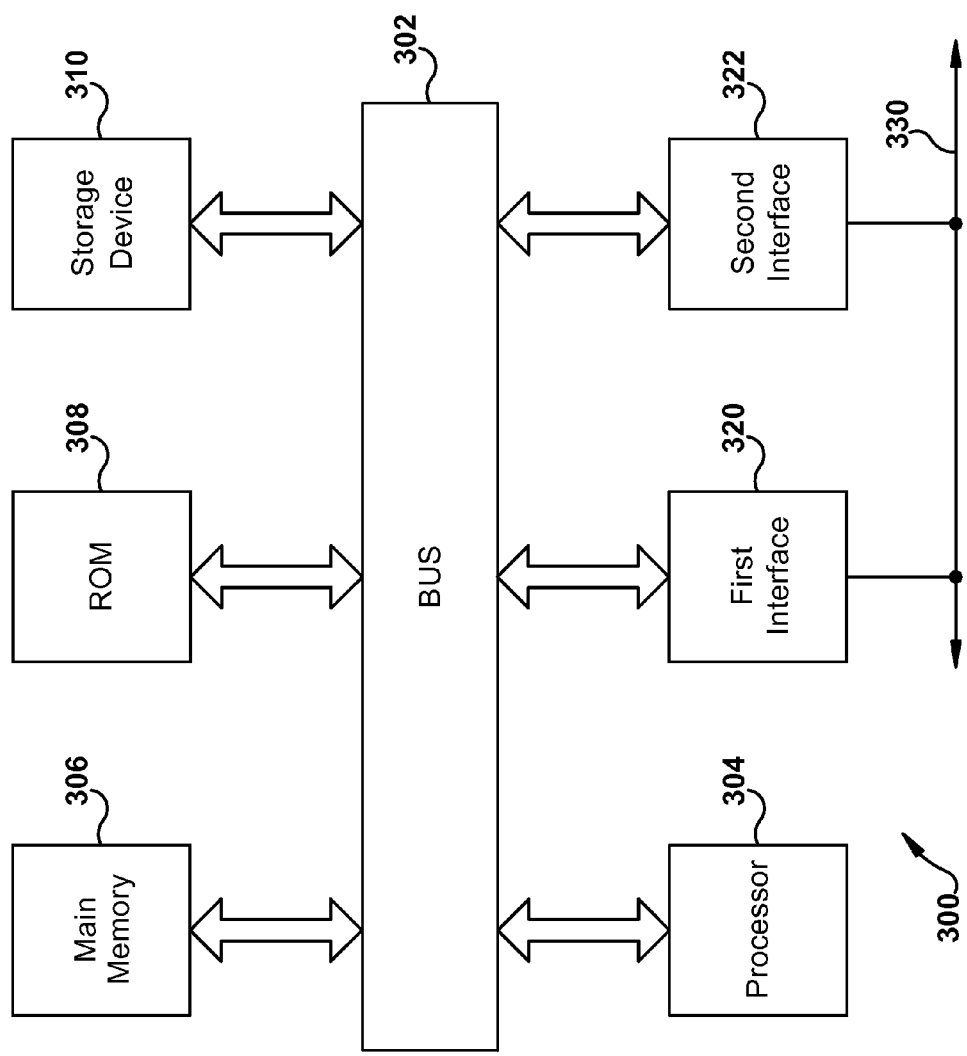
FIG. 3 is a block diagram illustrating an example embodiment of a computer system upon which an example embodiment for detecting false V2V messages may be implemented.

FIG. 3 is a block diagram illustrating an example of a computer system 300 upon which an example embodiment can be implemented. Computer system 300 may be employed to implement the functionality of the trustworthiness logic 120 in the apparatus 102 and/or the wireless receiver 110 (FIG. 1), the physical evidence module 210 and/or the EEBL module 220 of the wireless receiver 110 (FIG. 2), and the statistic model module 230, the EEBL buffer module 232 and/or the correlation module 230 of the trustworthiness logic 120 (FIG. 3).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, and/or flash storage, is provided and coupled to bus 302 for storing information and instructions.

An aspect of the example embodiment is related to the use of computer system 300 for detecting false V2V EEBL messages via physical evidence obtained from one or more associated vehicles such as RF properties of the one or more associated vehicles. According to an example embodiment, obtaining evidence and detecting false EEBL messages is provided by computer system 300 in response to the processor 304 executing one or more sequences of one or more instructions contained in a non-transitory main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any non-transitory medium that participates in providing instructions to processor 304 for execution. Such a medium may take many forms, including but not limited to non-volatile media, and volatile media. Non-volatile media include for example optical or magnetic disks, such as storage device 310. Volatile media include dynamic memory such as main memory 306. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASH-PROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a communication interface 318 comprising first and second communication interfaces 320, 322 operatively coupled with the bus 302. Communication interface 318 provides a two-way data communication coupling computer system 300 to a communication link 330. For example, communication interface 318 may be a local area network (LAN) card to provide a data communication connection to a compatible LAN such as for example a Controller Area Network (CAN) network. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information.

In an example embodiment described below, changes in physical evidence collected from other vehicles, such as RSSI changes, are modeled and monitored for use in correlating received V2V messages with the physical evidence to determine the trustworthiness of the messages.

The change $p(v, u, \Delta t)$ in the received power level $p(v, u, t)$ described above has several unique characteristics that provide advantages and unexpected results. First, the change is generally impacted by a large number of independent random factors such as the random variations of movement patterns of the vehicle and speeds, dynamic changes of the surrounding environments (that impact radio propagations) as the vehicles move about, and random obstructions to radio signals between the vehicles v and u. Second, the change over each small time interval is largely independent of the change in any other small time interval in the distant past. These characteristics are consonant with Wiener Processes as used herein, which have been shown to be effective in modeling stochastic processes with similar characteristics, and provide an effective tool for modeling $p(v, u, \Delta t)$. Furthermore, Wiener Processes are easily implemented and the parameters therefore can be easily estimated using sample values of the variable to be modeled. These stochastic models, such as the preferred Weiner Processes for example, are highly suitable for potentially resource-constraint in-vehicle devices as in the example embodiments.

In an example embodiment, each vehicle v uses a Wiener Process to generate an interval estimation of the expected levels of received power from each nearby vehicle u in the next time interval. An actual received power level higher than the upper bound of the estimated interval indicates a sudden deceleration of vehicle u.

The following Wiener Process described in Equation 1 can be used:

$$p(v, u, \Delta t) = \mu \Delta t + \alpha \delta \sqrt{\Delta t} \quad (1)$$

where $\mu$ is the instantaneous mean and $\delta$ is the instantaneous standard deviation of $p(v, u, \Delta t)$, and a is a random variable with the standard normal distribution. This Wiener Process models the potential change in the mean and the standard deviation of $p(v, u, \Delta t)$ over time. For any given time interval $\Delta t$, the values of $\mu$ and $\delta$ can be estimated using the sample values of $p(v, u, \Delta t)$ during the past m consecutive time intervals of length $\Delta t$. This also ensures that the model adapts automatically to the most recent V2V communication environment from vehicle u to vehicle v.

A special case of the Wiener Process of the example embodiment is when $p=0$ and $\delta=1$, in which case, $p(v, u, \Delta t)$ is modeled as a random variable during each time interval $\Delta t$. In particular, $p(v, u, \Delta t)$ has a normal distribution with a mean 0 and a standard deviation $\sqrt{\Delta t}$. In this special case in accordance with the example embodiment, $p(v, u, \Delta t)$ is modeled in Equation 2 as:

$$p(v, u, \Delta t) = \alpha \sqrt{\Delta t} \quad (2)$$

Next, this special case Wiener Process is used in a further example embodiment to illustrate a procedure for detecting significant changes in the received power level. Since a follows the standard normal distribution, the probability that $p(v, u, \Delta t)$ is below a target level is computed. For example, $p(v, u, \Delta t)$ will be below $3\sqrt{\Delta t}$ with probability 99.85%, and below $2\sqrt{\Delta t}$ with probability 97.5%. Therefore, to detect a significant change, an upper bound $x\sqrt{\Delta t}$ is first set, where x can be any positive real number but is typically a small integer, for the expected received power level at the end of the next interval of length $\Delta t$. Then, a $p(v, u, \Delta t)$ value higher than $x\sqrt{\Delta t}$ is deemed as a significant change. For any given value of x, the false positive rate (the probability that the vehicle will falsely claim that a significant change in the received power level has occurred) can be determined. For example, the false positive rate will be 0.15% when $x=3$, and 2.5% when $x=2$. This approach uses only a single sample value, namely the most recent sample value, of $p(v, u, \Delta t)$ to detect whether there is a significant change in the received power level.

In a further example embodiment described below, change trends in physical evidence collected from other vehicles, such as RSSI change trends, are monitored and determined for use in improving robustness of the statistical change determination used to correlate received V2V messages with the physical evidence to determine the trustworthiness of the messages.

It is to be noted that when a vehicle is abruptly breaking, RSSI from a series of its packets should display a steep increase. Thus, an alternative embodiment advantageously detects false EEBL messages by hypotheses testing using the k recent sample values of $p(v, u, \Delta t)$. It is to be recalled that when no vehicle is performing emergency braking, the change $p(v, u, \Delta t)$ in received power $p(v, u, t)$ is modeled as the Wiener Process. Upon receiving an EEBL message, the vehicle uses the k most recent sample values of $p(v, u, \Delta t)$ to test whether the mean of these sample values represent a significant change from the mean of the population of the values of $p(v, u, \Delta t)$. The Null Hypotheses may be characterized as "the mean of the k recent samples is no larger than the population mean," and the Alternative Hypotheses may be characterized as "the mean of the k recent samples is higher than the population mean." The alternative hypothesis indicates a sudden significant reduction of the distance between vehicles v and u or an emergency braking event by vehicle u. When the population of $p(v, u, \Delta t)$ follows the special case of the Wiener Process described above, its mean will be zero. When the population of $p(v, u, \Delta t)$ follows the general Wiener Process, the population mean p and standard deviation $\delta\sqrt{\Delta t}$ can be estimated using sample values of $p(v, u, \Delta t)$ over a period of time significantly longer than the time it takes to collect the k recent sample values.

It is to be appreciated that statistical models other than those described herein may also be used to detect significant changes in the received power level. These models include, for example, accumulative change detection models, sequential change detection models, and other similar and/or equivalent models now known or hereinafter developed.

Figure 4:
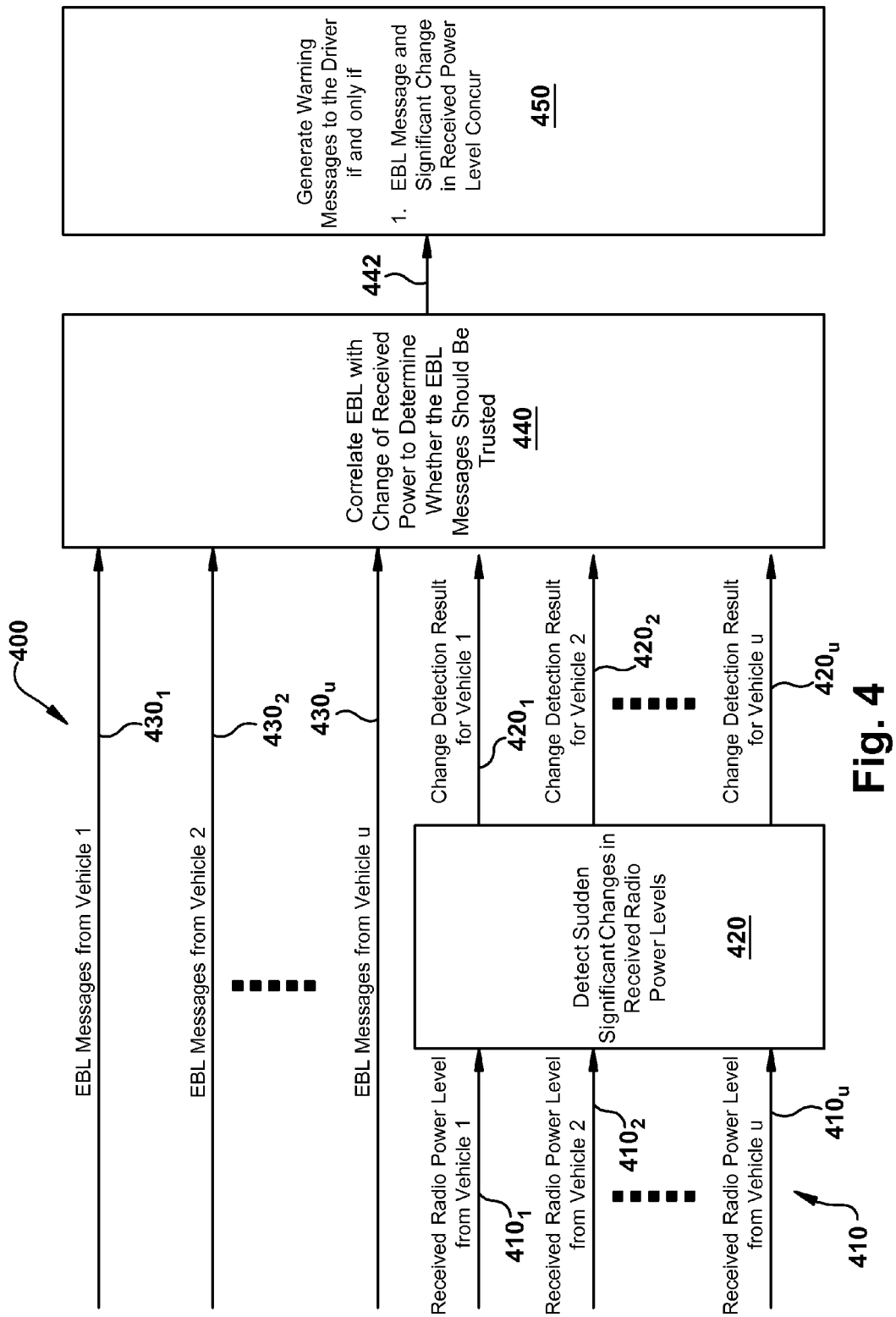
FIG. 4 is a process flow diagram illustrating an example embodiment of a process flow executed by a computer system for detecting false V2V messages in accordance with an example embodiment.

A process flow 400 illustrating the detection of false V2V messages by a false signal detecting apparatus 102 (FIG. 1) in accordance with an example embodiment is shown in FIG. 4 for ease of describing the example embodiment. With reference now to that Figure, the flow 400 moves figuratively from left to right as viewed. A plurality of signals 410 are received wherein the signals 410 relate to physical evidence of parameters of one or more associated motor vehicles. In the example embodiment, the signals relate to an intensity of an RF signal received from the associated motor vehicles. In particular, the signals 410 comprise radio power level signals $410_1, 410_2, \ldots 410_u$ received from associated vehicles 1-u.

The physical evidence signals $410_1$ - $410_u$ are processed at 420 to detect sudden significant changes in their value. In the example embodiment, the signals $410_1$ - $410_u$ are inspected to detect sudden significant changes in received radio power levels. The sudden significant change detection logic 420 is configured to generate an output signal corresponding to each of the inputs upon detection of a sudden significant change in the signal level. In that regard, output signals $420_1, 420_2, \ldots, 420_u$ signals carry logical levels representative of whether a sudden significant change in the input signals was detected by the changed logic 420.

By way of example, it may be determined by the sudden significant change detection logic 420 that the radio power level received from Vehicle$_1$ has made a sudden significant change while the remaining vehicles comprising Vehicle$_2$-Vehicle$_u$ have no change in received radio power level, wherein the output signal $420_1$ for vehicle$_1$ establishes a true or logical "1" level while outputs $420_2$-$420_u$ for vehicles$_{2-u}$ are maintained at a false or logical "0" state.

In addition to the above, correlation logic 440 is configured to receive V2V messages $430_1, 430_2, \ldots 430_u$ from the associated Vehicle$_1$, Vehicle$_2$, . . . Vehicle$_u$, respectively. The correlation logic 440 determines a correlation between a logic level of the output signals $420_1, 420_2, \ldots 420_u$ with the received V2V messages according to signals $430_1, 430_2, \ldots 430_u$ in order to determine a correlation between any sudden changes and respective vehicle messages.

In the above example, the correlation logic 440 would expect that the V2V message signal $430_1$ to be trustworthy since the logic at output signal $420_1$ is at a true or "1" condition, while the remaining V2V messages $430_2$-$430_u$ to be untrustworthy, if present, given that there are corresponding change detection result signals $420_2$-$420_u$ are at a false or logical "0" state.

In the example embodiment, if any of the V2V message signals are generated and, further, are determined to be trustworthy, the correlation logic 440 generates an output signal 442 representative of a potentially dangerous situation for embodiments wherein the WV messages relate to emergency brake light messages.

Lastly, with reference to FIG. 4, warning logic 450 generates messages, signals, or the like when the correlation logic 440 determines a true correlation between emergency V2V messages and a corresponding physical manifestation expected to accompany the corresponding message.

In view of the foregoing structural and functional features described above, a methodology in accordance with example embodiments will be better appreciated with reference to FIG. 5. While, for purposes of simplicity of explanation, the methodology of FIG. 5 is shown and described as executing serially, it is to be understood and appreciated that the example embodiments are not limited by their illustrated orders, as some aspects could occur in different orders and/or concurrently with other aspects from that shown and described herein. Moreover, not all illustrated features may be required to implement a methodology in accordance with an aspect of an example embodiment. The methodologies described herein are suitably adapted to be implemented in hardware, software, or a combination thereof.

FIG. 5 is a block diagram illustrating an example of a methodology 500 of detecting false V2V messages by a false signal detecting apparatus 102 (FIG. 1) in accordance with an example embodiment. The methodology may be implemented by the apparatus 102 (FIGS. 1 and 2) and/or computer system 300 (FIG. 3) and is shown in a simplistic flow chart in FIG. 5 for ease of describing the example embodiment. With reference now to that Figure, at 502, a first signal from an associated first vehicle is received by a wireless receiver 110 (FIG. 1). In the example embodiment, the first signal comprises a first message representative of a relative safety condition between the associated first vehicle and the apparatus. More particularly, in the example embodiment, the receiving the first signal comprises receiving an emergency electronic brake light (EEBL) message. In an alternative embodiment, the receiving the first signal comprises receiving a "speeding" message, a sudden acceleration message, a sudden deceleration message, or any other V2V message which might impact the safety of the vehicles involved.

In step 504, data representative of a physical condition of the associated first vehicle is obtaining by the message trustworthiness logic 120 (FIG. 1) operatively coupled with the wireless receiver. In a further embodiment the obtaining data comprises obtaining data representative of a radio power level of the first signal as the physical condition of the associated first vehicle. In still a further embodiment the obtaining data representative of the radio power level of the first signal comprises determining one or more changes in the radio power level of the first signal over time. In yet a further embodiment the obtaining data representative of the physical condition of the associated first vehicle comprises obtaining radar signal data representative of a relative distance between the associated first vehicle and the apparatus as the physical condition of the associated first vehicle.

In yet a further embodiment, in step 504, the obtaining data comprises obtaining data representative of a functional characteristic of the associated first vehicle such as, for example, functional characteristics relating to vehicle make, model, model year. Different vehicles may use different radio transmitter and antenna technologies. This means that the radio signal propagation properties can differ depending on the vehicle's make and model. Therefore, each vehicle can use different radio propagation models to keep track of the received signals from different vehicles. Messages from each vehicle u can carry information that will be needed by other vehicles to determine which radio propagation model should be used to model the received radio signal from vehicle u.

In yet still a further embodiment, in step 504, the obtaining the data representative of a physical condition of the associated first vehicle comprises obtaining the data representative of the physical condition by a sampling circuit configured to obtain plural samples of the physical condition of the associated first vehicle over time.

Further in accordance with an example embodiment, the obtaining the data representative of a physical condition of the associated first vehicle comprises obtaining the data representative of the physical condition by a sampling circuit such as for example the physical evidence module 210 (FIG. 2) configured to obtain plural samples of the physical condition of the associated first vehicle over time.

In step 506, the trustworthiness of the first message received by the wireless receiver is determined by the message trustworthiness logic 120 in accordance with a statistical modeling 230 (FIG. 2) of the data received from the physical evidence module 210 (FIG. 2), the data being representative of a selected physical condition of the associated first vehicle. In an embodiment, the determining the trustworthiness of the EEBL message comprises determining the trustworthiness of the EEBL message using a statistical modeling of the radio power level of the first signal over time. In a further embodiment, the determining the trustworthiness of the EEBL message comprises determining a time-wise correlation between the one or more changes in the radio power level of the first signal and the wireless receiver receiving the EEBL message.

In a further embodiment, the determining the trustworthiness of the message in step 506 comprises determining the trustworthiness of the message in accordance with a Wiener Process as the statistical modeling the one or more changes in the radio power level of the first signal over time, and the determining the time-wise correlation comprises determining the time-wise correlation between the one or more changes in the radio power level of the first signal and the wireless receiver receiving the EEBL message.

In yet a further embodiment, the determining the trustworthiness of the EEBL message in step 506 comprises determining the trustworthiness of the EEBL message in accordance with a statistical modeling of the relative distance between the associated first vehicle and the apparatus of the first signal over time.

In still yet a further embodiment, in step 506, the determining the trustworthiness of the first message received by the wireless receiver comprises generating modified data representative of the physical condition of the associated first vehicle by adjusting the data representative of the physical condition of the associated first vehicle in accordance with the data representative of the functional characteristic of the associated first vehicle such as for example by the physical evidence module 210 (FIG. 2), and further the determining the trustworthiness of the first message received by the wireless receiver comprises determining the trustworthiness of the first message received by the wireless receiver in accordance with a statistical modeling by the statistical model module 230 (FIG. 2) of the modified data representative of the physical condition of the associated first vehicle.

In still yet a further embodiment, in step 506, the determining the trustworthiness of the first message received by the wireless receiver comprises determining: i) a moving/rolling mean value of the plural samples of the physical condition over time, and ii) a mean value of k most recent samples relative to the wireless receiver receiving the first signal, and performing a comparison of the mean value of k most recent samples with the moving/rolling mean value of the plural samples.

In the example embodiment, at step 508 a decision is made on whether the received V2V message is trustworthy. If indeed the received V2V message is determined to be trustworthy, a safety alert signal is generated at step 510 by the message trustworthiness logic responsive to the determining of the trustworthiness of the message.

In a further embodiment, the safety alert signal is selectively generated responsive to determining the time-wise correlation between one or more changes in the radio power level of the first signal and the wireless receiver receiving the EEBL message.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus comprising:
a wireless receiver configured to receive a signal from a vehicle, wherein the signal comprises a message representative of a relative safety condition between the vehicle and the apparatus; and
message trustworthiness logic operatively coupled with the wireless receiver and operable to measure a power of the signal, the message trustworthiness logic determining a trustworthiness level of the message in accordance with a statistical modeling of the power of the signal over an interval of time, and
the message trustworthiness logic selectively generating a safety alert signal responsive to the trustworthiness level of the message.

2. The apparatus according to claim 1, wherein:
the message comprises an emergency electronic brake light (EEBL) message; and
the power of the signal comprises the radio power of the signal.

3. The apparatus according to claim 2, wherein:
the message trustworthiness logic determines one or more changes the radio power level of the signal over time;
the message trustworthiness logic comprises a correlation module operatively coupled with the wireless receiver, the correlation module determining a time-wise correlation value between the one or more changes in the radio power level of the signal and the wireless receiver receiving the EEBL message; and
the message trustworthiness logic selectively generating the safety alert signal responsive to the time-wise correlation value.

4. The apparatus according to claim 3, wherein the statistical modeling is a Wiener Process.

5. The apparatus according to claim 1, wherein:
the message trustworthiness logic obtains radar signal data representative of a relative distance between the vehicle and the apparatus; and
the message trustworthiness logic is configured to determine the trustworthiness level of the message in accordance with the statistical modeling of the radar signal data over time.

6. The apparatus according to claim 1, wherein:
the message trustworthiness logic is operable to obtain data representative of a functional characteristic of the vehicle;
the message trustworthiness logic is operable to generate modified data representative of the power of the signal by adjusting the power of the signal in accordance with the data representative of the functional characteristic; and
the message trustworthiness logic determines the trustworthiness level of the message in accordance with the statistical modeling of the modified data representative of the power of the signal.

7. The apparatus according to claim 1, wherein the message trustworthiness logic comprises a sampling circuit configured to obtain a plurality of samples of the power of the signal over time, wherein determining the trustworthiness level of the message in accordance with a statistical modeling comprises:
determining a rolling mean value of the plurality of samples over time, determining a mean value of k most recent samples of the plurality of samples relative to the wireless receiver receiving the signal from the vehicle, and determining the trustworthiness level of the message in accordance with a comparison of the mean value of k most recent samples with the rolling mean value of the plurality of samples over time.

8. A method comprising:

receiving by a wireless receiver a signal from a vehicle, the signal comprising a message representative of a relative safety condition between the vehicle and the wireless receiver;

obtaining by message trustworthiness logic operatively coupled with the wireless receiver a power of the signal;

determining by the message trustworthiness logic a trustworthiness level of the message in accordance with a statistical modeling of the power of the signal over an interval of time; and selectively generating by the message trustworthiness logic a safety alert signal responsive to the determining of the trustworthiness level of the message.

9. The method according to claim 8, wherein:

the message comprises an emergency electronic brake light (EEBL) message; and the power of the signal comprises the radio power of the signal.

10. The method according to claim 9, further comprising:

determining one or more changes in the radio power level of the signal over time;

determining a time-wise correlation value between the one or more changes in the radio power level of the signal and the wireless receiver receiving the EEBL message; and selectively generating the safety alert signal responsive to the time-wise correlation value.

11. The method according to claim 10, wherein the statistical modeling is a Wiener Process.

12. The method according to claim 8, further comprising:

obtaining radar signal data representative of a relative distance between the vehicle and the apparatus; and determining the trustworthiness level of the message in accordance with the statistical modeling of the radar signal data over time.

13. The method according to claim 8, further comprising:

obtaining data representative of a functional characteristic of the vehicle;

generating modified data representative of the power of the signal by adjusting the power of the signal in accordance with the data representative of the functional characteristic of the vehicle; and determining the trustworthiness level of the message received by the wireless receiver in accordance with the statistical modeling of the modified data representative of the power of the signal.

14. The method according to claim 8, further comprises obtaining the power of the signal by a sampling circuit configured to obtain a plurality of samples of the power of the signal over time, wherein determining the trustworthiness level of the message in accordance with a statistical modeling comprises:

determining a rolling mean value of the plurality of samples over time, determining a mean value of k most recent samples of the plurality of samples relative to the wireless receiver receiving the signal from the vehicle, and determining the trustworthiness level of the message in accordance with a comparison of the mean value of k most recent samples with the rolling mean value of the plurality of samples over time.

15. Logic encoded in one or more tangible non-transitory computer readable medium for execution by an associated processor and when executed by the associated processor the logic being operable to:

receive by a wireless receiver a signal from a vehicle, the signal comprising a message representative of a relative safety condition between the vehicle and an apparatus;

measure, by message trustworthiness logic operatively coupled with the wireless receiver, a power of the signal;

determine by the message trustworthiness logic a trustworthiness level of the message in accordance with a statistical modeling of the power of the signal; and selectively generate by the message trustworthiness logic a safety alert signal responsive to the trustworthiness level of the message.

16. The logic according to claim 15, wherein:

the message comprises an emergency electronic brake light (EEBL) message; and the power of the signal comprises the radio power of the signal.

17. The logic according to claim 16, wherein:

measuring the radio power level of the signal comprises determining one or more changes in the radio power level of the signal over time;

determining the trustworthiness level of the EEBL message comprises determining a time-wise correlation value between the one or more changes in the radio power level of the signal and the wireless receiver receiving the EEBL message; and selectively generating the safety alert signal responsive to the time-wise correlation value.

18. The logic according to claim 17, wherein the statistical modeling is a Wiener Process.

19. The logic according to claim 15, wherein:

measuring measuring the power of the signal comprises obtaining radar signal data representative of a relative distance between the vehicle and the wireless receiver; and determining the trustworthiness level of the message in accordance with the statistical modeling of the radar signal data over time.

20. The logic according to claim 15, wherein:

the message trustworthiness logic obtains data representative of a functional characteristic of the vehicle;

the determining the trustworthiness level of the message comprises generating modified data representative of the power of the signal by adjusting the power of the signal in accordance with the data representative of the functional characteristic; and the message trustworthiness logic determines the trustworthiness level of the message in accordance with the statistical modeling of the modified data representative of the power of the signal.

21. The logic according to claim 15, wherein:

measuring the power level of the signal comprises obtaining the power of the signal by a sampling circuit configured to obtain a plurality of samples of the power of the signal over time;

determining the trustworthiness level of the message in accordance with a statistical modeling comprises:

determining a rolling mean value of the plurality of samples over time, determining a mean value of k most recent samples of the plurality of samples relative to the wireless receiver receiving the first signal from the vehicle, and determining the trustworthiness level of the message in accordance with a comparison of the mean value of k most recent samples with the rolling mean value of the plurality of samples over time.

* * * * *